US011578193B2

(12) United States Patent
Ota et al.

(10) Patent No.: US 11,578,193 B2
(45) Date of Patent: Feb. 14, 2023

(54) RESIN COMPOSITION AND METHOD FOR PRODUCING THE SAME (71) Applicant: PLANTIC TECHNOLOGIES LTD, Altona (AU)

(72) Inventors: Masahiko Ota, Kurashiki (JP); Nicholas John McCaffrey, Victoria (AU)

(73) Assignee: PLANTIC TECHNOLOGIES LTD, Altona (AU)

(*) Notice: Subject to any disclaimer, the term of this patent is extended or adjusted under 35 U.S.C. 154(b) by 337 days.

(21) Appl. No.: 16/625,284

(22) PCT Filed: Jun. 25, 2018

(86) PCT No.: PCT/IB2018/054648
§ 371 (c)(1),
(2) Date: Dec. 20, 2019

(87) PCT Pub. No.: WO2019/003077
PCT Pub. Date: Jan. 3, 2019

(65) Prior Publication Data
US 2020/0339785 A1    Oct. 29, 2020

(30) Foreign Application Priority Data

Jun. 26, 2017 (JP) ............................. JP2017-124081

(51) Int. Cl.
C08L 3/06 (2006.01)
C08L 3/08 (2006.01)
C08L 3/12 (2006.01)
C08L 29/04 (2006.01)
C08J 3/12 (2006.01)
C08K 3/34 (2006.01)
C08K 5/098 (2006.01)

(52) U.S. Cl.
CPC . C08L 3/06 (2013.01); C08J 3/12 (2013.01); C08K 3/346 (2013.01); C08K 5/098 (2013.01); C08L 3/08 (2013.01); C08L 3/12 (2013.01); C08L 29/04 (2013.01); C08K 2201/003 (2013.01); C08L 2201/06 (2013.01); C08L 2201/14 (2013.01); C08L 2203/16 (2013.01); C08L 2205/18 (2013.01); C08L 2205/22 (2013.01)

(58) Field of Classification Search
CPC ..... C08K 3/34; C08L 3/06; C08L 3/08; C08L 3/12; C08L 29/04
USPC .......................................................... 524/47
See application file for complete search history.

(56) References Cited

U.S. PATENT DOCUMENTS

| 5,032,337 | A | 7/1991 | Nachtergaele et al. |
| 5,108,807 | A * | 4/1992 | Tucker ................. B32B 27/306 523/124 |
| 5,362,778 | A * | 11/1994 | Famili ................. C08L 29/04 264/211.21 |
| 6,107,371 | A | 8/2000 | Roesser et al. |
| 7,854,994 | B2 | 12/2010 | Henderson-Rutgers et al. |
| 2009/0054548 | A1 | 2/2009 | Wang et al. |
| 2009/0110942 | A1* | 4/2009 | Henderson-Rutgers ................. B32B 27/24 524/110 |
| 2009/0312462 | A1 | 12/2009 | Oakley et al. |
| 2010/0307951 | A1 | 12/2010 | Khemani et al. |
| 2013/0011593 | A1 | 1/2013 | Wang et al. |

FOREIGN PATENT DOCUMENTS

| CN | 101778897 A | 7/2010 |
| CN | 103289131 A | 9/2013 |
| CN | 104356428 A | 2/2015 |
| CN | 104945683 A | 9/2015 |
| CN | 105670191 A | 6/2016 |
| CN | 106279960 A | 1/2017 |
| JP | H06248150 A * | 9/1994 |
| JP | 2002-532600 A | 10/2002 |
| JP | 2010-516861 A | 5/2010 |
| JP | 2010-529220 A | 8/2010 |
| WO | WO 00/36006 A1 | 6/2000 |
| WO | WO 2008/144845 A1 | 12/2008 |
| WO | WO 2009/024876 A2 | 2/2009 |
| WO | WO 2012/134347 A2 | 10/2012 |

OTHER PUBLICATIONS

Notice of Reasons for Refusal dated Oct. 12, 2021 in Japanese Patent Application No. 2019-526394 (with English machine translation), 12 pages.
Combinsed Chinese Office Action and Search Report dated Apr. 27, 2021 in Patent Application No. 201880042303.6 (with English machine translation and English translation of Category of Cited Documents), 23 pages.
R. L. Whistler, et al., "Starch: Chemistry and Technology," China Food Press, 1988, 8 pages (with English language translation).
Jun Liu, et al., "Quality Inspection of Edible Packaging Materials," China Quality Inspection Press, 2017, 12 pages (with English language translation).
Extended European Search Report dated Feb. 5, 2021 in European Patent Application No. 18824064.2, 7 pages.

(Continued)

Primary Examiner — Deve V Hall
(74) Attorney, Agent, or Firm — Oblon, McClelland, Maier & Neustadt, L.L.P.

(57) ABSTRACT

Provided is a resin composition comprising a starch and a polyvinyl alcohol, which is excellent in the breaking strength and breaking elongation at a low temperature, and at the same time, has the good gas barrier property. The resin composition comprises modified starch and polyvinyl alcohol, and where in a cross section photograph by a transmission electron microscope, a cross-sectional area of each of particles of the polyvinyl alcohol dispersed is calculated, and a cross-sectional shape of each of the particles of the polyvinyl alcohol is postulated to be circular based on the cross-sectional area, the particles of the polyvinyl alcohol have a conversion particle diameter of 50 to 300 nm, and the conversion particle diameter has a dispersity of 3.0 or less.

14 Claims, 1 Drawing Sheet (56) References Cited

OTHER PUBLICATIONS

Wentao Wang, et al., "Effects of various nanomaterials on the properties of starch/poly(vinyl alcohol) composite films formed by blow extrusion process," Iranian Polymer Journal, vol. 24, XP002801818, 2015, pp. 687-696.
International Search Report dated Aug. 27, 2018 in PCT/IB2018/054648, 6 pages.
International Preliminary Report on Patentability and Written Opinion of the International Searching Authority dated Dec. 31, 2019 in PCT/IB2018/054648 filed Jun. 25, 2018, 6 pages.

* cited by examiner

RESIN COMPOSITION AND METHOD FOR PRODUCING THE SAME

TECHNICAL FIELD

The present invention relates to a resin composition comprising a modified starch and a polyvinyl alcohol and a method for producing the same.

BACKGROUND ART

Heretofore, since a composition comprising starch and polyvinyl alcohol is biodegradable, and is excellent in the gas barrier property, it has been widely used in a container for packaging foods (Patent Documents 1 and 2).

PRIOR ART DOCUMENTS

Patent Documents

Patent Document 1: JP-T-2002-532600
Patent Document 2: JP-A-2010-529220

SUMMARY OF THE INVENTION

Problems to be Solved by the Invention

Meanwhile, a container for packaging foods is often placed under the environment at lower than 10° C., at the time of packaging, transportation, and selling; however, in the compositions in Patent Documents 1 and 2, the breaking strength at a low temperature is not sufficient, a container is broken by impact of falling or the like, and when the container is used as a multilayer structure, a composition layer comprising starch may be broken, and the content of the container may be damaged.

An object of the present invention is to provide a resin composition comprising starch and polyvinyl alcohol, which is excellent in the breaking strength and the breaking elongation at a low temperature (10° C. or lower) and, at the same time, has the good gas barrier property.

Means for Solving Problems

In the case where in a resin composition comprising predetermined amounts of a modified starch and a polyvinyl alcohol, a cross-sectional area of dispersed polyvinyl alcohol particles is calculated from a cross section photograph by a transmission electron microscope, and a cross-sectional shape of the polyvinyl alcohol particles is postulated to be circular based on the cross-sectional area, the present inventors have found out that the above-mentioned object is attained when a conversion particle diameter of the polyvinyl alcohol particles is 50 to 300 nm, and a dispersity of the conversion particle diameter is 3.0 or less.

Aspects of the present invention, which can attain the above-mentioned objects, are as follows:

[1] A resin composition comprising a modified starch (A) and a polyvinyl alcohol (B), wherein the resin composition comprises the modified starch (A) in an amount of 50 to 98% by mass and the polyvinyl alcohol (B) in an amount of 2 to 50% by mass based on a total mass of the modified starch (A) and the polyvinyl alcohol (B), at least part of the polyvinyl alcohol (B) is dispersed in the modified starch (A), wherein in a cross section photograph by a transmission electron microscope, a cross-sectional area of each of particles of the polyvinyl alcohol (B) dispersed is calculated, and a cross-sectional shape of each of the particles of the polyvinyl alcohol (B) is postulated to be circular based on the cross-sectional area, the particles of the polyvinyl alcohol (B) have a conversion particle diameter of 50 to 300 nm as expressed by number average, and the conversion particle diameter has a dispersity of 3.0 or less.

[2] The resin composition according to [1], wherein the modified starch (A) is at least one selected from the group consisting of an etherized starch, an esterified starch, a cationized starch, and a crosslinked starch.

[3] The resin composition according to [1] or [2], wherein the modified starch (A) is an etherized starch having a hydroxyalkyl group having 2 to 6 carbon atoms, an esterified starch having a structural unit derived from dicarboxylic anhydride, or a combination of the etherized starch and the esterified starch.

[4] The resin composition according to any one of [1] to [3], wherein the modified starch (A) has an amylose content of 50% by mass or more.

[5] The resin composition according to any one of [1] to [4], wherein a 4% aqueous solution of the polyvinyl alcohol (B) has a viscosity at 20° C., which is measured in accordance with JIS Z 8803, of 1 to 50 mPa·s.

[6] The resin composition according to any one of [1] to [5], which further comprises clay.

[7] The resin composition according to any one of [1] to [6], wherein a content of a fatty acid having 12 to 22 carbon atoms, a salt of the fatty acid, or a combination of the fatty acid and the salt of the fatty acid is 5% by mass or less.

[8] A pellet comprising the resin composition according to any one of [1] to [7].

[9] A film comprising the resin composition according to any one of [1] to [7].

[10] A multilayer laminate comprising at least one layer comprising the resin composition according to any one of [1] to [7].

[11] A container formed using the resin composition according to any one of [1] to [7].

[12] A method for producing the resin composition according to any one of [1] to [7], the method comprising 1) a step of mixing the modified starch (A) and the polyvinyl alcohol (B) while heating, 2) a step of extruding a melted mixture, and 3) a step of cooling and drying an extruded melted product.

[13] The production method according to [12], wherein in the step 1, cooking treatment is performed at a temperature of higher than 120° C. and not higher than 180° C.

[14] The production method according to [12] or [13], wherein in the step 1, water is introduced into the mixture.

[15] The production method according to [14], wherein a water content of the mixture extruded in the step 2 is 10 to 50% by mass.

Effect of the Invention

The resin composition of the present invention has the excellent gas barrier property, and at the same time, is excellent in the breaking strength and the breaking elongation at a low temperature, and is biodegradable, so that it can be suitably used in a package and a container for foods stored at a low temperature.

MODES FOR CARRYING OUT THE INVENTION

Aspects of the present invention are specifically described below.

<Modified Starch (A)>

The resin composition of the present invention comprises a modified starch (A). As the modified starch (A), for example, at least one selected from the group consisting of an etherized starch, an esterified starch, a cationized starch, and a crosslinked starch can be used.

Examples of the starch include starches derived from cassava, corn, potato, sweet potato, sago, tapioca, sorghum, bean, bracken, lotus, *Trapa japonica*, wheat, rice, oat, arrowroot, pea, and the like. Inter alia, starch derived from corn or cassava is preferable, and starch derived from high amylose corn is further preferable. Starch may be a single substance, or may be a mixture of two or more starches.

Examples of the etherized starch include alkyl etherized starches such as methyl etherized starch, carboxyalkyl etherized starches such as carboxymethyl etherized starch, and hydroxyalkyl etherized starches such as etherized starch having a hydroxyalkyl group having 2 to 6 carbon atoms, and the like. Alternatively, allyl etherized starches and the like can also be used.

Examples of the esterified starch include esterified starches having a structural unit derived from carboxylic acid, such as esterified starch having a structural unit derived from acetic acid; esterified starches having a structural unit derived from dicarboxylic anhydride, such as esterified starch having a structural unit derived from maleic anhydride, esterified starch having a structural unit derived from phthalic anhydride, and esterified starch having a structural unit derived from octenylsuccinic anhydride; esterified starches having a structural unit derived from oxo acid, such as nitric acid esterified starch, phosphoric acid esterified starch, and urea-phosphoric acid esterified starch. Other examples thereof include xanthogenic acid esterified starch, acetoacetic acid esterified starch, and the like.

Examples of the cationized starch include a reaction product of starch and 2-diethylaminoethyl chloride, a reaction product of starch and 2,3-epoxypropyltrimethylammonium chloride, and the like.

Examples of the crosslinked starch include formaldehyde-crosslinked starch, epichlorhydrin-crosslinked starch, phosphoric acid-crosslinked starch, acrolein-crosslinked starch, and the like.

As the modified starch (A), an etherized starch having a hydroxyalkyl group having 2 to 6 carbon atoms, an esterified starch having a structural unit derived from dicarboxylic anhydride, or a combination thereof is preferable, and hydroxyethyl etherized starch, hydroxypropyl etherized starch, hydroxybutyl etherized starch, an esterified starch having a structural unit derived from maleic anhydride, an esterified starch having a structural unit derived from phthalic anhydride, an esterified starch having a structural unit derived from octenylsuccinic anhydride, or a combination thereof is more preferable.

In the modified starch (A), the content of amylose in the modified starch (A) is preferably 50% by mass or more, more preferably 55% by mass or more, and further preferably 60% by mass or more. When the content of amylose in the modified starch (A) is 50% by mass or more, there is a tendency that increase in the viscosity is suppressed, and a conversion particle diameter of polyvinyl alcohol particles described later becomes difficult to be coarsened. On the other hand, in the modified starch (A), usually, the content of amylose in the modified starch (A) is 90% by mass or less.

In the modified starch (A), the water content in the modified starch (A) is preferably 10 to 15% by mass.

The etherized starch having a hydroxyalkyl group having 2 to 6 carbon atoms may be an etherized starch obtained by a reaction between alkylene oxide such as ethylene oxide, propylene oxide, or butylene oxide, and starch. The average number of hydroxy groups used in modification is preferably 0.05 to 2 per one glucose unit in the starch.

As the modified starch (A), commercially available modified starches can be used. Examples of a representative commercial product of the modified starch (A) include ECOFILM (registered trademark) and National 7 (registered trademark) which are hydroxypropyl etherized starches available from National Starch and Chemical Company.

<Polyvinyl Alcohol (B)>

The resin composition of the present invention comprises a polyvinyl alcohol (B). The polyvinyl alcohol (B) has a saponification degree of preferably 80 to 99.8 mol %. When the saponification degree of the polyvinyl alcohol (B) is within the above range, there is a tendency that the sufficient strength and the gas barrier property are easily obtained. The saponification degree is more preferably 85 mol % or more, and further preferably 88 mol % or more. The saponification degree refers to a molar fraction of a hydroxy group to a total of a hydroxy group and an ester group in polyvinyl alcohol.

In the polyvinyl alcohol (B), a 4% aqueous solution of the polyvinyl alcohol (B) has a viscosity at 20° C., which is measured in accordance with JIS Z 8803, of 1 to 50 mPa·s. When the above viscosity of the polyvinyl alcohol (B) is within the above range, there is a tendency that the sufficient strength and gas barrier property are easily obtained. The lower limit of the viscosity of the polyvinyl alcohol (B) is more preferably 3 mPa·s, and further preferably 5 mPa·s, and the upper limit is more preferably 45 mPa·s, and further preferably 35 mPa·s.

The polyvinyl alcohol (B) can further comprise another monomer unit other than a vinyl alcohol unit. Examples of the other monomer unit include a monomer unit derived from an ethylenically unsaturated monomer, and the like. Examples of the ethylenically unsaturated monomer include α-olefins such as ethylene, propylene, n-butene, isobutylene, and 1-hexene; acrylic acids and salts thereof; unsaturated monomers having an acrylic acid ester group; methacrylic acids and salts thereof; unsaturated monomers having a methacrylic acid ester group; acrylamide, N-methylacrylamide, N-ethylacrylamide, N,N-dimethylacrylamide, diacetoneacrylamide, acrylamidepropanesulfonic acid and a salt thereof, acrylamidepropyldimethylamine and a salt thereof (e.g., quaternary salt); methacrylamide, N-methylmethacrylamide, N-ethylmethacrylamide, methacrylamidepropanesulfonic acid and a salt thereof, methacrylamidepropyldimethylamine and a salt thereof (e.g., quaternary salt); vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether, and 2,3-diacetoxy-1-vinyloxypropane; cyanidated vinyls such as acrylonitrile and methacrylonitrile;

halogenated vinyls such as vinyl chloride and vinyl fluoride; halogenated vinylidenes such as vinylidene chloride and vinylidene fluoride; allyl compounds such as allyl acetate, 2,3-diacetoxy-1-allyloxypropane, and allyl chloride; unsaturated dicarboxylic acids such as maleic acid, itaconic acid, and fumaric acid, and a salt or an ester thereof; vinylsilyl compounds such as vinyltrimethoxysilane; isopropenyl acetate; vinyl ester monomers such as vinyl formate, vinyl acetate, vinyl propionate, vinyl butyrate, vinyl isobutyrate, vinyl pivalate, vinyl versatate, vinyl caproate, vinyl calrylate, vinyl laurate, vinyl palmitate, vinyl stearate, vinyl oleate, and vinyl benzoate. Additionally, monomer units derived from unsaturated monomers, which have not been saponified, are also included in the other monomer unit. The content of the other monomer unit is preferably 10 mol % or less, and more preferably 5 mol % or less.

A method for producing the polyvinyl alcohol (B) is not particularly limited. Examples thereof include a method of copolymerizing a vinyl alcohol monomer with another monomer, and saponifying the resulting copolymer to be converted into a vinyl alcohol unit. Examples of a polymerization manner upon copolymerization include batch polymerization, semi-batch polymerization, continuous polymerization, semi-continuous polymerization, and the like. Examples of the polymerization method include known methods such as a mass polymerization method, a solution polymerization method, a suspension polymerization method, and an emulsion polymerization method. As the saponification of the copolymer, known methods can be applied. For example, the saponification can be performed in the state where the copolymer is dissolved in an alcohol or a water-containing alcohol. The alcohol that can be used at that time is a lower alcohol such as methanol or ethanol.

The resin composition of the present invention comprises the modified starch (A) in an amount of 50 to 98% by mass and the polyvinyl alcohol (B) in an amount of 2 to 50% by mass based on the total mass of the modified starch (A) and the polyvinyl alcohol (B). When the resin composition of the present invention comprises the modified starch (A) and the polyvinyl alcohol (B) within the above range, there is a tendency that the good gas barrier property is obtained, and at the same time, the strength at a low temperature is easily improved. The content of the modified starch (A) is preferably 70 to 98% by mass, and more preferably 90 to 98% by mass. The content of the polyvinyl alcohol (B) is preferably 2 to 30% by mass, and more preferably 2 to 10% by mass.

In the resin composition of the present invention, at least part of the polyvinyl alcohol (B) is dispersed in the modified starch (A), and where in a cross section photograph by a transmission electron microscope, the cross-sectional area of each of particles of the polyvinyl alcohol (B) dispersed is calculated, and the cross-sectional shape of each of the particles of the polyvinyl alcohol (B) is postulated to be circular based on the cross-sectional area, the particles of the polyvinyl alcohol (B) have a conversion particle diameter of 50 to 300 nm as expressed by number average, and the conversion particle has a dispersity of 3.0 or less.

The conversion particle diameter of the particles of the polyvinyl alcohol (B) where the cross-sectional shape of each of the particles of the polyvinyl alcohol (B) is postulated to be circular based on the cross-sectional area refers to a diameter of a circle having the same area as the area of an elliptic shape, when the cross-sectional shape of each of the particles of the polyvinyl alcohol (B) in a cross section photograph by a transmission electron microscope has the elliptic shape. Additionally, the dispersity of the conversion particle diameter refers to (weight average)/(number average) of the conversion particle diameter. The conversion particle diameter is obtained by performing calculation as described in examples described later.

When the conversion particle diameter is less than 50 μm or exceeds 300 μm, there is a tendency that the breaking elongation at a low temperature and the breaking strength are inferior in both cases. Additionally, when the dispersity of the conversion particle diameter exceeds 3.0, there is a tendency that the breaking elongation at a low temperature is inferior.

The conversion particle diameter is preferably 50 to 295 nm, more preferably 50 to 290 nm, and further preferably 50 to 285 nm. The dispersity of the conversion particle diameter is preferably 2.9 or less, and more preferably 2.8 or less.

The resin composition of the present invention can further comprise clay. Examples of the clay include synthetic and natural layered silicate clays such as montmorillonite, bentonite, beidellite, mica, hectorite, saponite, nontronite, sauconite, vermiculite, ledikite, magadite, kenyaite, stevensite, volkonskoite, and a mixture thereof.

When the resin composition of the present invention comprises the clay, the content of the clay in the resin composition is preferably 0.1 to 5% by mass, more preferably 0.1 to 3% by mass, and further preferably 0.5 to 2% by mass. When the resin composition comprises the clay in an amount within the above range, there is a tendency that the transparency, the flexibility, the tensile strength, the impact resistance and/or the tensile properties are easily improved.

The resin composition of the present invention can further comprise a fatty acid having 12 to 22 carbon atoms, a salt thereof, or a combination thereof. Examples of the fatty acid having 12 to 22 carbon atoms and a salt thereof include stearic acid, calcium stearate, sodium stearate, palmitic acid, lauric acid, myristic acid, linoleic acid, behenic acid, and the like.

When the resin composition of the present invention comprises a fatty acid having 12 to 22 carbon atoms, a salt thereof, or a combination thereof, the content in the resin composition is preferably 5% by mass or less, more preferably 1% by mass or less, further preferably 0.5% by mass or less, particularly preferably 0.1% by mass or less, and most preferably less than 0.1% by mass. Additionally, the resin composition may not comprise a fatty acid having 12 to 22 carbon atoms, a salt thereof, or a combination thereof.

The resin composition of the present invention can comprise additives such as fillers, processing stabilizers, weather resistance stabilizers, coloring agents, ultraviolet absorbing agents, light stabilizers, antioxidants, antistatic agents, flame-retardants, plasticizers, other thermoplastic resins, lubricants, perfumes, antifoaming agents, deodorants, bulking agents, releasing agents, mold releasing agents, reinforcing agents, crosslinking agents, fungicides, antiseptics, and crystallization rate retardants as necessary, in such a range that the effect of the present invention is not hindered. From the viewpoint of the gas barrier property, the total content of these additives is preferably 2% by mass or less based on the mass of the resin composition, and the composition more preferably does not comprise these additives. In addition, a component that does not hinder the effect of the present invention, for example, water may be also contained in an amount exceeding 2% by mass based on the mass of the resin composition.

The resin composition of the present invention may be in the form of a pellet or a film, and in both forms, at least part of the polyvinyl alcohol (B) is dispersed in the modified starch (A), the polyvinyl alcohol (B) has the above-mentioned predetermined conversion particle diameter, and the conversion particle diameter has the predetermined dispersity.

The resin composition of the present invention can be used in a multilayer laminate comprising at least one layer comprising the resin composition. Additionally, the resin composition can be molded into a container, a film, a sheet, a tube, a bottle, a fiber or the like, and inter alia, the resin composition is excellent in the strength and the gas barrier property at a low temperature, and is biodegradable, so that it can be suitably used in containers and packaging films for packaging foods, or the like.

The resin composition of the present invention can be produced by a production method comprising 1) a step of mixing the modified starch (A) and the polyvinyl alcohol (B) while heating, 2) a step of extruding the melted mixture, and 3) a step of cooling and drying the extruded melted product.

The step 1 of mixing the modified starch (A) and the polyvinyl alcohol (B) while heating is usually performed using an extruder. In the extruder, a shearing stress is applied to each component with a screw, and each component is uniformly mixed while heating by application of the external heat to a barrel.

As the extruder, a monoaxial or twin screw extruder can be used. The twin screw extruder may be any of corotation and reverse rotation. The screw diameter is, for example, 20 to 150 mm, and the ratio L/D of the extruder length (L) to the screw diameter (D) may be, for example, 20 to 50. The rotating speed of the screw is preferably at least 80 rpm, and more preferably at least 100 rpm. Additionally, the extrusion molding pressure is preferably at least 5 bar (0.5 MPa), and more preferably at least 10 bar (1.0 MPa).

The modified starch (A), the polyvinyl alcohol (B) and, optionally, the other component can be directly introduced into the extruder, respectively. Additionally, these respective components are pre-mixed using a mixer, and the mixture may be also introduced into the extruder.

In the step 1, the extruder is heated to a temperature of preferably higher than 120° C. and not higher than 180° C., more preferably 160 to 180° C., and cooking treatment is performed. Herein, the cooking treatment is treatment of grinding and gelling starch particles. The heating can be performed by applying heat to the barrel of the extruder from the outside. Each barrel can be heated to a target temperature by applying a temperature that is step-wisely changed. When the cooking treatment is performed at a temperature exceeding 120° C., the particles of the polyvinyl alcohol (B) can be prevented from being coarsened and can have the above-mentioned predetermined conversion particle diameter, and the conversion particle diameter has the predetermined dispersity.

In the step 1, water may be introduced into the extruder at a relatively initial stage, and water can be introduced before the temperature reaches the above-mentioned heating temperature, for example, at 100° C. or lower. The modified starch (A) is subjected to the cooking treatment by the combination of the moisture, the heat, and the shearing stress, and can be gelatinized (gelled). Additionally, by separately introducing water, a water-soluble polymer such as polyvinyl alcohol (B) is dissolved, the resin composition is softened, and the modulus and the brittleness can be reduced.

It is suitable to push the heated mixture toward a die while the temperature is lowered to preferably 85 to 120° C., and more preferably 100 to 120° C., in order to prevent foaming. Additionally, by exhausting the air from the barrel, foaming can be prevented and the moisture can be removed.

The retention time in the extruder can be set depending on the temperature profile and the screw speed, and is preferably between 1 minute and 2.5 minutes.

In the step 2 in which the melted mixture is extruded, the melted mixture which has been pushed in the extruder while being melted and kneaded is extruded from the die. The temperature of the die is preferably 85 to 120° C., and more preferably 90 to 110° C.

The water content in the mixture which has been extruded in the step 2 is preferably 10 to 50% by mass. The lower limit of the water content is more preferably 20% by mass, further preferably 22% by mass, and particularly preferably 25% by mass, and the upper limit is more preferably 40% by mass, further preferably 40% by mass, and particularly preferably 35% by mass.

In the step 3 in which the extruded melted product is cooled and dried, the melted product can be extruded into a film shape or a strand shape.

When the melted product is extruded into a film shape, the melted product can be extruded from a die for forming a film, and then cooled and dried while being wound with a take-up roller. It is preferable to cool the melted product between the die and the roller so as to prevent the melted product from attaching to the roller. For drying, the roll may be warmed or the dehumidified air may be supplied during winding. In the case of the blowing-tube method, the dehumidified air can be used in order to inflate the film when the film is released from the die. By accompanying talc in the air stream, blocking of the film can be also prevented.

When the melted product is extruded into a strand shape, the melted product is extruded from a strand nozzle having a plurality of holes, and the strand is cut with a rotation cutter, so that the strand can be formed into a pellet shape. In order to prevent agglutination of pellets, the hot air, the dehumidified air or an infrared heater is applied, while vibration is applied periodically or regularly, so that the moisture in the pellet can be removed.

The present invention is described in detail below by way of examples, but the present invention is not limited to them.

EXAMPLES

<Test Method>
(1) Measurement of PVOH Phase

After a sample piece with a small size was cut with a microtome to prepare an observation cross section, vapor staining was performed with a 4% aqueous solution of osmium tetraoxide for 7 days under an environment of 30° C. Subsequently, after vacuuming was performed with a rotary pump for 12 hours, the stained cut piece was cut with a cryomicrotome in directions parallel to the MD direction and the TD direction, respectively, to obtain a frozen slice.

Knife speed: 1.0 mm/s
Temperature for cooling sample and knife: −100° C.
Thickness of slice: 90 nm The slice prepared by the above procedure was observed with a transmission electron microscope (TEM).

Apparatus: Transmission electron microscope H7100FA manufactured by Hitachi, Ltd.
Acceleration voltage: 100 kV
Magnification: 50,000

For a dispersion derived from PVOH in a microscope image, particles for which the whole contour was displayed in a photographic screen (the contour is not interrupted) were picked up with image analysis software (mac-view manufactured by MOUNTECH Co., Ltd.). With regard to the total 100 cross sections of 50 MD parallel cross sections and 50 TD parallel cross sections, each cross-sectional area was calculated. When the image analysis software did not automatically recognize the contour of particles, treatment was performed so as to recognize the contour of particles. For the calculated cross-sectional area, a diameter (conversion particle diameter) was calculated when the cross section was postulated to be circular. With regard to the total of 100 conversion particle diameters, the number average and the weight average were calculated, and the number average was used as a conversion particle diameter, and the dispersity was defined as (weight average)/(number average). As the value of the dispersity is more close to 1, this expresses monodispersibity.

(2) Measurement of Breaking Strength and Breaking Elongation at Low Temperature (0° C.)

After storage and humidification for 2 weeks under 23° C. and 50% RH, a film was cut to have a width of 15 mm and a length of 150 mm, and for a pellet, a strand before cutting was cut to have a diameter of 3 mm and a length of 100 mm, thereby, samples were obtained. After the samples were left to stand at 0° C. for 2 hours, the samples were attached to a tensile testing apparatus with a thermostat chamber set at 0° C., and after leaving to stand for 30 minutes, a tensile test was conducted. The number average value for stress and the number average value for elongation at breaking points of 5 samples were used as the breaking strength and the breaking elongation, respectively.

Apparatus: Instron 3367 (with a thermostat chamber)
Thermostat bath temperature control range: −40° C. to 160° C.
Temperature to be set: 0° C.
Speed: 10 mm/min
Distance between chucks: 50 mm (3) Measurement of Oxygen Permeability After storage and humidification for 2 weeks under 23° C. and 50% RH or 23° C. and 75% RH, the sample was attached to an oxygen permeation amount measuring apparatus, and oxygen permeability was measured. The measurement conditions were as follows.

Apparatus: MOCON OX-TRAN2/20 manufactured by Modern Controls Inc.
Temperature: 23° C.
Humidity on oxygen supply side and carrier gas side: 50% RH or 75% RH
Oxygen pressure: 1.0 atm
Carrier gas pressure: 1.0 atm (4) Method of Measuring Viscosity of Polyvinyl Alcohol A 4% aqueous solution of polyvinyl alcohol was prepared in accordance with JIS Z 8803 (Falling sphere viscometer) and JIS K 6726 (Testing methods for polyvinyl alcohol), and the viscosity was measured at 20° C. using a Hoppler viscometer.

(5) Preparation of Resin Composition

Figure 1:
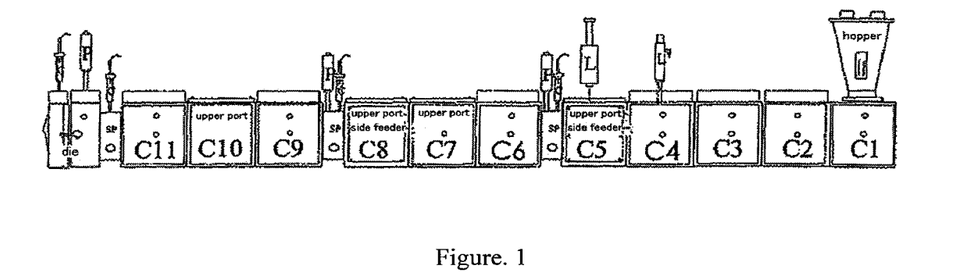
FIG. 1 shows a schematic view of an extrusion molding machine suitable for preparing the resin composition of the present invention.
Figure 2:
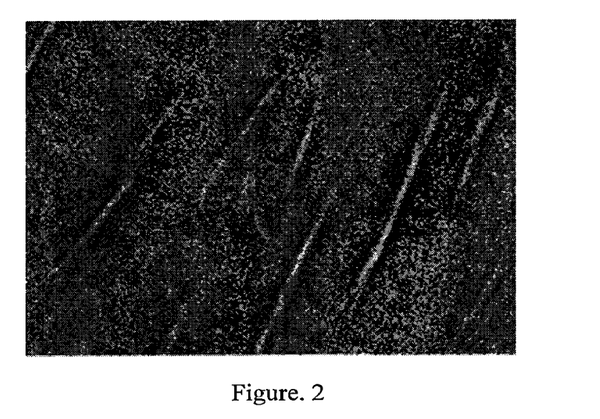
FIG. 2 shows an image of observation with a transmission electron microscope in a TD direction of a cross section of a film comprising the resin composition obtained in Example 2.
Figure 3:
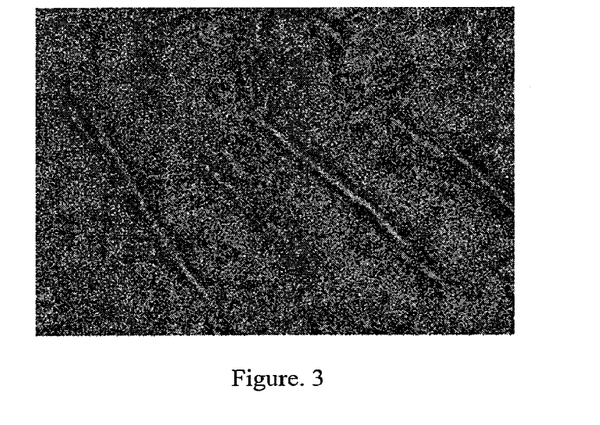
FIG. 3 shows an image of observation with a transmission electron microscope in an MD direction of a cross section of a film comprising the resin composition obtained in Example 2.

A resin composition was prepared by supplying raw materials to a twin screw extruder connected to a liquid pump, and thereafter, removing the moisture from a molded product. The twin screw extruder was operated in a co-rotation (engaging self-wiping) mode. An example of a suitable extruder is shown in FIG. 1.

The raw materials were supplied into a barrel through a hopper at C1 via a weight feeder. The water was jetted into the barrel through a liquid pump (L) at C4. The temperature zone of each of C5 to C9 was a cooking zone, and perfect gelatinization was completed in the zones. A die or a film die resides after C11.

The screw diameter, the L/D ratio, and the maximum rotating speed of the extruder used are as follows:
Screw diameter: 27 mm
L/D ratio: 48
Maximum rotating speed: 1200 rpm At the time of film formation, the resin composition was extruded from a die for forming a film, and then the extruded product was wound with a roller. During the winding, drying and cooling of the film were performed by warming the roll and supplying the dehumidified air.

At the time of pellet molding, the resin composition was extruded from a strand nozzle having a plurality of holes, and cut with a rotation cutter to form the strand into a pellet shape. Since the pellet contains the excessive moisture, the moisture was removed with the hot air, the dehumidified air or an infrared heater, while vibration was regularly applied, in order to prevent agglutination.

When the pellet was subjected to measurement of the breaking strength and measurement of the breaking elongation, a strand before cutting which had been dried by the same method as described above was used. When the pellet was subjected to measurement of oxygen permeability, the pellet was used as a raw material and was molded into a film shape by the same method as the film forming.

(6) Material Used

<Modified Starch (A)>

ECOFILM (registered trademark): Corn starch modified with propylene oxide, amylose content 80% by mass, obtained from National Starch and Chemical Company National 7 (registered trademark): Cassava starch modified with propylene oxide, amylose content 20% by mass, obtained from Ingredion Incorporated <Polyvinyl Alcohol (B)>

ELVANOL (registered trademark) 71-30: Polyvinyl alcohol resin, saponification degree 99 mol % or more, viscosity 27 to 33 mPa·s (20° C., 4% aqueous solution), obtained from KURARAY CO., LTD.

ELVANOL (registered trademark) 90-50: Polyvinyl alcohol resin, saponification degree 99 mol % or more, viscosity 12 to 15 mPa·s (20° C., 4% aqueous solution), obtained from KURARAY CO., LTD.

KURARAY POVAL (registered trademark) PVA 217: Polyvinyl alcohol resin, saponification degree 88 mol %, viscosity 22 mPa·s (20° C., 4% aqueous solution), obtained from KURARAY CO., LTD.

KURARAY POVAL (registered trademark) PVA205: Polyvinyl alcohol resin, saponification degree 88 mol %, viscosity 5 mPa·s (20° C., 4% aqueous solution), obtained from KURARAY CO., LTD.

<Clay>

CLOISITE (registered trademark) 20A: Natural montmorillonite modified with dimethyl di(hydrogenated tallow) quaternary ammonium chloride, obtained from Southern Clay Industries Example 1

As shown in Table 3 below, ECOFILM (registered trademark) (9.80 kg) and ELVANOL 71-30 (200 g) were mixed in a tumbler mixer for 2 hours. The mixed powder was supplied into a hopper of an extruder via a weight feeder at a speed of 3.5 kg/hour. Water was injected into a barrel through a liquid pump at a flow rate of 26 g/min. The winding speed was set so that the thickness of a film extruded from a die was 350 μm after cooling and drying. The cylinder temperature was set at the temperature profile A in Table 1 below. Each of C5 to C9 is a cooking zone.

| Temperature profile A [° C.]: | | | | | | | | | | | | |
|---|---|---|---|---|---|---|---|---|---|---|---|---|
| C1 | C2 | C3 | C4 | C5 | C6 | C7 | C8 | C9 | C10 | C11 | Adaptor | Die |
| 40 | 70 | 80 | 90 | 120 | 140 | 160 | 170 | 180 | 140 | 120 | 100 | 100 |

Screw speed: 162 rpm

Example 2

According to the same manner as in Example 1 except that, ECOFILM (registered trademark) (9.00 kg) and ELVANOL71-30 (1.00 kg) were used as raw materials, a film having a thickness of 350 μm was prepared.

Example 3

According to the same manner as in Example 1 except that, ECOFILM (registered trademark) (7.00 kg) and ELVANOL71-30 (3.00 kg) were used as raw materials, a film having a thickness of 350 μm was prepared.

Example 4

According to the same manner as in Example 1 except that, ECOFILM (registered trademark) (5.00 kg) and ELVANOL71-30 (5.00 kg) were used as raw materials, a film having a thickness of 350 μm was prepared.

Example 5

According to the same manner as in Example 1 except that, ECOFILM (registered trademark) (6.75 kg), National 7 (registered trademark) (2.25 kg), ELVANOL (registered trademark) 71-30 (1.00 kg), and CLOISITE (registered trademark) 20A (200 g) were used as raw materials, a film having a thickness of 350 μm was prepared.

Example 6

According to the same manner as in Example 1 except that, ECOFILM (registered trademark) (4.50 kg), National 7 (registered trademark) (4.50 kg), ELVANOL (registered trademark) 71-30 (1.00 kg), and CLOISITE (registered trademark) 20A (200 g) were used as raw materials, a film having a thickness of 350 vim was prepared.

Example 7

According to the same manner as in Example 5 except that, ELVANOL (registered trademark) 90-50 (1.00 kg) was used as PVOH, a film having a thickness of 350 μm was prepared.

Example 8

According to the same manner as in Example 5 except that, KURARAY POVAL (registered trademark) PVA217 (1.00 kg) was used as PVOH, a film having a thickness of 350 vim was prepared.

Example 9

According to the same manner as in Example 5 except that, KURARAY POVAL (registered trademark) PVA 205 (1.00 kg) was used as PVOH, a film having a thickness of 350 μm was prepared.

Example 10

According to the same manner as in Example 5 except that, a step was performed in which the resin composition was extruded from the die and caused to pass through the strand nozzle for pelletization, and thereafter, the moisture was removed with the hot air, a pellet was prepared.

Comparative Example 1

According to the same manner as in Example 1 except that, ECOFILM (registered trademark) (10.00 kg) was used as a raw material, a film having a thickness of 350 μm was prepared.

Comparative Example 2

According to the same manner as in Example 1 except that, ECOFILM (registered trademark) (9.90 kg) and ELVANOL71-30 (100 g) were used as raw materials, a film having a thickness of 350 μm was prepared.

Comparative Example 3

According to the same manner as in Example 1 except that, ECOFILM (registered trademark) (3.00 kg) and ELVANOL (registered trademark) 71-30 (7.00 kg) were used as raw materials, a film having a thickness of 350 μm was prepared.

Comparative Example 4

According to the same manner as in Example 1 except that, National 7 (registered trademark) (9.00 kg) and ELVANOL (registered trademark) 71-30 (1.00 kg) were used as raw materials, a film having a thickness of 350 μm was prepared.

Comparative Example 5

According to the same manner as in Example 5 except that, the cylinder temperature was changed to the temperature profile B in Table 2 below, a film having a thickness of 350 μm was prepared. Each of C5 to C9 is a cooking zone.

TABLE 2

| | | | | | Temperature profile B [° C.]: | | | | | | | |
|---|---|---|---|---|---|---|---|---|---|---|---|---|
| C1 | C2 | C3 | C4 | C5 | C6 | C7 | C8 | C9 | C10 | C11 | Adaptor | Die |
| 40 | 70 | 80 | 90 | 95 | 120 | 140 | 150 | 150 | 140 | 120 | 100 | 100 |

Comparative Example 6

According to the same manner as in Comparative Example 5 except that, a step was performed in which the resin composition was extruded from the die and caused to pass through the strand nozzle for pelletization, and thereafter, the moisture was removed with the hot air, a pellet was prepared.

TABLE 3

| | Raw material/kg | | | | |
|---|---|---|---|---|---|
| | Ecofilm (registered trade mark) | National 7 (registered trade mark) | PVOH | 20A | Total |
| Example 1 | 9.80 | — | 0.20 | — | 10.0 |
| Example 2 | 9.00 | — | 1.00 | — | 10.0 |
| Example 3 | 7.00 | — | 3.00 | — | 10.0 |
| Example 4 | 5.00 | — | 5.00 | — | 10.0 |
| Example 5 | 6.75 | 2.25 | 1.00 | 0.20 | 10.2 |
| Example 6 | 4.50 | 4.50 | 1.00 | 0.20 | 10.2 |
| Example 7 | 6.75 | 2.25 | 1.00 | 0.20 | 10.2 |
| Example 8 | 6.75 | 2.25 | 1.00 | 0.20 | 10.2 |
| Example 9 | 6.75 | 2.25 | 1.00 | 0.20 | 10.2 |
| Example 10 | 6.75 | 2.25 | 1.00 | 0.20 | 10.2 |
| Comparative Example 1 | 10.00 | — | — | — | 10.0 |
| Comparative Example 2 | 9.90 | — | 0.10 | — | 10.0 |
| Comparative Example 3 | 3.00 | — | 7.00 | — | 10.0 |
| Comparative Example 4 | — | 9.00 | 1.00 | — | 10.0 |
| Comparative Example 5 | 6.75 | 2.25 | 1.00 | 0.20 | 10.2 |
| Comparative Example 6 | 6.75 | 2.25 | 1.00 | 0.20 | 10.2 |

TABLE 4

| | Modified starch | | Polyvinyl alcohol | | | Clay | |
|---|---|---|---|---|---|---|---|
| | Addition amount (mass %) | Amylose content in modified starch (mass %) | Addition amount (mass %) | Saponification degree (mol %) | Viscosity (mPa·s) | Addition amount (mass %) | Brand |
| Example 1 | 98 | 80 | 2 | 99.0-99.8 | 27-33 | 0 | — |
| Example 2 | 90 | 80 | 10 | 99.0-99.8 | 27-33 | 0 | — |
| Example 3 | 70 | 80 | 30 | 99.0-99.8 | 27-33 | 0 | — |
| Example 4 | 50 | 80 | 50 | 99.0-99.8 | 27-33 | 0 | — |
| Example 5 | 88 | 65 | 10 | 99.0-99.8 | 27-33 | 2 | C20A |
| Example 6 | 90 | 50 | 10 | 99.0-99.8 | 27-33 | 2 | C20A |
| Example 7 | 88 | 65 | 10 | 99.0-99.8 | 12-15 | 2 | C20A |
| Example 8 | 88 | 65 | 10 | 88 | 22 | 2 | C20A |
| Example 9 | 88 | 65 | 10 | 88 | 5 | 2 | C20A |
| Example 10 | 88 | 65 | 10 | 99.0-99.8 | 27-33 | 2 | C20A |
| Comparative Example 1 | 100 | 80 | 0 | — | — | 0 | — |
| Comparative Example 2 | 99 | 80 | 1 | 99.0-99.8 | 27-33 | 0 | — |
| Comparative Example 3 | 30 | 80 | 70 | 99.0-99.8 | 27-33 | 0 | — |
| Comparative Example 4 | 90 | 20 | 10 | 99.0-99.8 | 27-33 | 0 | — |
| Comparative Example 5 | 88 | 65 | 10 | 99.0-99.8 | 27-33 | 2 | C20A |
| Comparative Example 6 | 88 | 65 | 10 | 99.0-99.8 | 27-33 | 2 | C20A |

TABLE 4-continued

| | Product shape | Cylinder temperature (° C.) | Dispersed state of polyvinyl alcohol Number average conversion particle diameter (nm) | Dispersity of conversion particle diameter | Breaking strength at 0° C. (MPa) | Breaking elongation at 0° C. (%) | Oxygen permeability (mL·350 μm/ m²·atm·24 hr) 23° C. 50% RH | 23° C. 75% RH |
|---|---|---|---|---|---|---|---|---|
| Example 1 | Film | A | 134 | 2.2 | 45 | 20 | <0.05 | 0.12 |
| Example 2 | Film | A | 143 | 2.4 | 43 | 20 | <0.05 | 0.12 |
| Example 3 | Film | A | 116 | 2.8 | 41 | 29 | <0,05 | 0.12 |
| Example 4 | Film | A | 283 | 1.9 | 38 | 120 | <0.05 | 0.12 |
| Example 5 | Film | A | 128 | 1.4 | 43 | 20 | <0.05 | 0.12 |
| Example 6 | Film | A | 228 | 1.8 | 43 | 20 | <0.05 | 0.12 |
| Example 7 | Film | A | 121 | 1.4 | 43 | 20 | <0.05 | 0.12 |
| Example 8 | Film | A | 87 | 1.8 | 43 | 18 | <0.05 | 0.12 |
| Example 9 | Film | A | 52 | 2.2 | 43 | 20 | <0.05 | 0.12 |
| Example 10 | Pellet | A | 90 | 1.5 | 43 | 36 | <0.05 | 0.12 |
| Comparative Example 1 | Film | A | | Not observed | 45 | 2 | 0.48 | 1.3 |
| Comparative Example 2 | Film | A | 142 | 3.2 | 45 | 2 | 0.12 | 0.8 |
| Comparative Example 3 | Film | A | | Conversion is impossible due to phase inversion | 3 | 170 | <0.05 | 2.2 |
| Comparative Example 4 | Film | A | 442 | 2.8 | 8 | 2 | <0.05 | 0.12 |
| Comparative Example 5 | Film | B | 332 | 3.5 | 43 | 2 | <0.05 | 0.12 |
| Comparative Example 6 | Pellet | B | 289 | 3.2 | 43 | 3 | <0.05 | 0.12 |

As shown in Table 4, in Examples 1 to 10, resin compositions having the high breaking strength and breaking elongation at a low temperature (0° C.; the same applies hereinafter) and having the excellent barrier property were obtained. In contrast, in Comparative Example 1 in which no polyvinyl alcohol was used, and Comparative Examples 2 and 6 in which the dispersity of polyvinyl alcohol was more than 3, the breaking elongation at a low temperature of the resulting resin compositions was not sufficient. In Comparative Example 3 in which polyvinyl alcohol was used in an amount exceeding 50% by mass, the breaking elongation at a low temperature was high, but the breaking strength was low, and additionally, the sufficient gas barrier property was not obtained under a high humidity. In Comparative Examples 4 and 5 in which the polyvinyl alcohol has a conversion particle diameter of more than 300 nm, the breaking elongation at a low temperature was not sufficient, and particularly in Comparative Example 4, the breaking strength was also inferior.

The invention claimed is:

1. A resin composition, comprising:
a modified starch (A), and
a polyvinyl alcohol (B),
wherein
the resin composition does not comprise a plasticizer or if present, the plasticizer is in an amount not greater than 2% by mass based on the mass of the resin composition,
the resin composition comprises the modified starch (A) in an amount of 50 to 98% by mass and the polyvinyl alcohol (B) in an amount of 2 to 50% by mass based on a total mass of the modified starch (A) and the polyvinyl alcohol (B),
at least part of the polyvinyl alcohol (B) is dispersed in the modified starch (A),
in a cross section photograph by a transmission electron microscope, a cross-sectional area of each of particles of the polyvinyl alcohol (B) dispersed is calculated, and a cross-sectional shape of each of the particles of the polyvinyl alcohol (B) is postulated to be circular based on the cross-sectional area, the particles of the polyvinyl alcohol (B) have a conversion particle diameter of 50 to 300 nm as expressed by number average, and the conversion particle diameter has a dispersity of 3.0 or less, and
the modified starch (A) has an amylose content of 50% by mass or more.

2. The resin composition according to claim 1, wherein the modified starch (A) is at least one selected from the group consisting of an etherized starch, an esterified starch, a cationized starch, and a crosslinked starch.

3. The resin composition according to claim 1, wherein the modified starch (A) is an etherized starch having a hydroxyalkyl group having 2 to 6 carbon atoms, an esterified starch having a structural unit derived from dicarboxylic anhydride, or a combination of the etherized starch and the esterified starch.

4. The resin composition according to claim 1, wherein a 4% aqueous solution of the polyvinyl alcohol (B) has a viscosity at 20° C. measured in accordance with JIS Z 8803 of 1 to 50 mPa·s.

5. The resin composition according to claim 1, further comprising: clay (C).

6. The resin composition according to claim 1, further comprising:
(D) a fatty acid having 12 to 22 carbon atoms, a salt of the fatty acid, or a combination of the fatty acid and the salt of the fatty acid,
wherein a content of (D) is 5% by mass or less.

7. A pellet, comprising the resin composition according to claim 1.

8. A film, comprising the resin composition according to claim 1.

9. A multilayer laminate, comprising at least one layer comprising the resin composition according to claim 1.

10. A container formed using the resin composition according to claim 1.

11. A method for producing the resin composition according to claim 1, the method comprising:
  1) mixing the modified starch (A) and the polyvinyl alcohol (B) while heating, thereby obtaining a melted mixture;
  2) extruding the melted mixture, thereby obtaining an extruded melted product; and
  3) cooling and drying the extruded melted product.

12. The production method according to claim 11, wherein in the mixing 1), the heating is performed at a temperature of higher than 120° C. but not higher than 180° C.

13. The production method according to claim 11, wherein in the mixing 1), water is introduced into the mixture.

14. The production method according to claim 13, wherein a water content of the mixture extruded in the extruding 2) is 10 to 50% by mass.

* * * * *